3,157,574
METHOD OF REDUCING CHOLESTEROL LEVELS
Arthur E. Heming, Lafayette Hill, Pa., and Dorsey E. Holtkamp, Lebanon, Ohio, assignors to Smith Kline & French Laboratories, Philadelphia, Pa., a corporation of Pennsylvania
No Drawing. Filed May 1, 1959, Ser. No. 810,213
5 Claims. (Cl. 167—65)

The present invention relates to antihypercholesterolemic compositions containing the D-isomer of triiodothyronine, 3,5,3'-D-triiodothyronine and a method of reducing cholesterol levels in hypercholesterolemic animal organisms.

Prior art on the clinical and physiological comparisons of the isomers of thyroxine and triiodothyronine show the L-isomer to be the active form. For example, the intravenous injection of D-thyroxine was demonstrated to have at best insignificant calorigenic effectiveness as compared to L-thyroxine. A fivefold dosage of sodium D-thyroxine as compared to L-thyroxine was unable to sustain the basal metabolic rate in ambulatory patients. In comparing the relative activities of the L and D triiodothyronine tested by the goiter prevention assay test method using rats, the activity of D-triiodothyronine was found to be only $\frac{1}{16}$ of that of the activity of the L-triiodothyronine. The teaching of the prior art clearly shows that it has been generally accepted that the only useful form of thyroxine and triiodothyronine is the L-isomer.

The D-isomer of triiodothyronine and its pharmaceutically active salts when used according to the method of this invention unexpectedly demonstrate tremendous pharmacodynamic action with few undesirable side effects. The hyperthyroid symptons such as a rise in basal metabolic rate and a rapid pulse rate which are at times evident with the use of thyrominetic agents are completely absent with the use of the D-triiodothyronine.

More specifically, the 3,5,3'-D-triiodothyronine and its nontoxic pharmaceutically active salts, when employed in the compositions of this invention and administered as hereinafter outlined are therapeutically active as antihypercholesterolemic agents. The medicinal preparations and method of this invention are consistently effective in bringing about a rapid drop in plasma cholesterol levels in hypercholesterolemic animal organisms using much lower dosage regimens than previous antihypercholesterolemic agents required. This allows the administration of the effective medicament in a pharmaceutical form convenient for administration.

The compositions of this invention are in dosage unit form comprising a nontoxic pharmaceutical carrier and the D-isomer of 3,5,3'-triiodothyronine or a pharmaceutically active salt thereof.

The method of preparting the D-isomer of the 3,5,3'-triiodothyronine is described in the United States Patent No. 2,823,164.

The 3,5,3'-D-triiodothyronine and the pharmaceutically active salts thereof are preferably employed with a nontoxic pharmaceutical carrier. The pharmaceutically active salts are the mono- and di-alkali metal salts, such as the salts of sodium and potassium, and the ammonium and the lower alkyl ammonium salts of the D-form of the triiodothyronine. The nontoxic pharmaceutical carrier may be, for example, either a solid or a liquid. Exemplary of solid carriers are lactose, magnesium stearate, terra alba, sucrose, talc, stearic acid, gelatin, agar, pectin or acacia. Exemplary of liquid carriers are peanut oil, olive oil, sesame oil and water. Similarly the carrier or diluent may include a time delay material such as glyceryl monostearate or glyceryl distearate alone or with a wax.

A wide variety of pharmaceutical forms can be used. Thus, if a solid carrier is used, the preparation can be tabletted, placed in a hard gelatin capsule or in the form of a troche or lozenge. The amount of solid carrier will vary widely but preferably will be from about 25 mg. to about 1 gm. If a liquid carrier is used, the preparation may be in the form of a soft gelatin capsule, placed in an ampul, in the form of a syrup or in a liquid suspension.

The D-isomer of 3,5,3'-triiodothyronine or a nontoxic pharmaceutically active salt thereof is present in an amount to lower plasma cholesterol levels in human beings and animals. Preferably the composition will contain the 3,5,3'-D-triiodothyronine or a nontoxic salt thereof in an amount of from about .025 mg. to about 1.0 mg., advantageously from about .050 mg. to about 0.500 mg. per dosage unit.

The method in accordance with this invention comprises administering internally to a hypercholesterolemic animal organism the D-isomer of triiodothyronine or a pharmaceutically active salt thereof as exemplified above admixed with a nontoxic pharmaceutical carrier, for example, any of the above compositions in an amount to lower plasma cholesterol levels. The 3,5,3'-D-triiodothyronine or a salt thereof preferably will be in an amount of from about .025 mg. to about 1.0 mg. and advantageously from about .050 mg. to about 0.500 mg. The administration may be parenterally or orally, the latter being the preferable route of administration. Advantageously equal doses are administered one to three times daily. Preferably the daily dosage will be from about .050 mg. to 3.0 mg. and most advantageously from about .100 mg. to about 1.5 mg. of active medicament. When the administration described above is carried out plasma cholesterol levels are reduced rapidly and effectively.

In veterinary practice, the compositions can be given per se or as an additive to the feed or drinking matter of the animals. These compositions are made following the conventional techniques of the pharmaceutical chemist involving mixing, granulating and compressing when necessary or variously mixing and dissolving the ingredients as appropriate to the desired end product.

In both animals and humans the compositions of this invention may contain additional nonhormonal medicinal ingredients such as vitamins, unsaturated fatty acids, lipotropic agents as well as flavoring agents.

The following examples are not limiting but illustrative of pharmaceutical compositions and methods of this invention.

*Example 1*

| Ingredients: | Amounts, mg. |
|---|---|
| 3,5,3'-D-triiodothyronine | 0.100 |
| Calcium sulfate, dihydrate | 205.000 |
| Sucrose | 35.000 |
| Starch | 18.000 |
| Talc | 9.000 |
| Stearic acid | 3.000 |

The sucrose and calcium sulfate are thoroughly mixed and passed through a #40 mesh screen. This mixture is then granulated with hot 10% gelatin solution and the wet granulation is passed through a #4 mesh screen and dried at 120° F. for three hours. The dry granulation is then passed through a #14 mesh screen and mixed with starch, talc, stearic acid and 3,5,3'-D-triiodothyronine which had previously been passed through a #60 mesh screen. The granulation is then compressed into tablets using an $^{11}\!/_{32}$" flat face bevel edge single score punch and die.

Administer one tablet three times a day.

Example 2

| Ingredients: | Amounts, mg. |
|---|---|
| 3,5,3'-D-triiodothyronine | 1.0 |
| Magnesium stearate | 10.0 |
| Lactose | 500.0 |

Screen above ingredients through a #40 mesh screen and mix well. Fill into a #0 hard gelatin pink capsule. The capsule is administered once a day.

Example 3

| Ingredients: | | Amounts |
|---|---|---|
| Sodium 3,5,3'-D-triiodothyronine | mg | 5.00 |
| Vitamin $B_6$ | gms | 0.04 |
| Nicotinamide | gms | 0.14 |
| Choline dihydrogen citrate | gms | 3.00 |
| Betaine | gms | 4.00 |
| Imitation wild cherry | ml | 0.10 |
| Sorbitol | gms | 25.00 |
| Water, q.s. to make volume 100.00 ml. | | |

Dissolve ingredients in 80 ml. of water and then bring final volume to 100 ml.

One teaspoonful of the above mixture is administered twice a day.

Example 4

| Ingredients: | | Amounts |
|---|---|---|
| Sodium 3,5,3'-D-triiodothyronine | mg | 4.00 |
| Sodium chloride | gms | 0.75 |
| Water for injection, q.s. to make volume 100.00 ml. | | |

Dissolved the salts in 60 ml. of water. Volume is brought to 100 ml. The solution is then filtered through a selas filter, filled into ampuls and autoclaved.

Example 5

| Ingredients: | Amounts, mg. |
|---|---|
| 3,5,3'-D-triiodothyronine | 0.010 |
| Peanut oil | 250.000 |

Above ingredients are mixed to a thick slurry and filled into a soft gelatin capsule.

The capsule is administered two to three times a day.

Example 6

| Ingredients: | Amounts, mg. |
|---|---|
| 3,5,3'-D-triiodothyronine | 1.0 |
| Magnesium stearate | 5.0 |
| Lactose | 400.0 |

The above ingredients are thoroughly mixed and filled into a #1 hard gelatin capsule.

What is claimed is:

1. The method of treating hypercholesterolemia in humans which comprises administering a composition consisting essentially of 3,5,3'-d-triiodothyronine.

2. The method of lowering plasma cholesterol levels in hypercholesterolemic animal organisms without a substantial rise in basal metabolic rate which comprises internally administering in an amount sufficient to lower plasma cholesterol level a compound selected from the group consisting of the D-isomer of 3,5,3'-triiodothyronine and its nontoxic pharmaceutically active salts.

3. The method of lowering plasma cholesterol levels in hypercholesterolemic animal organisms without a substantial rise in basal metabolic rate which comprises internally administering a dosage of about .050 mg. to about 0.500 mg. of a compound selected from the group consisting of the D-isomer of 3,5,3'-triiodothyronine and its nontoxic pharmaceutical salts.

4. The method of lowering plasma cholesterol levels in hypercholesterolemic animal organisms without a substantial rise in basal metabolic rate which comprises internally administering a daily dosage regimen of about .050 mg. to about 3.0 mg. of a compound selected from the group consisting of the D-isomer of 3,5,3'-triiodothyronine and its nontoxic pharmaceutical salts.

5. The method of lowering plasma cholesterol levels in hypercholesterolemic animal organisms without a substantial rise in basal metabolic rate which comprises internally administering a daily dosage regimen of about .050 mg. to about 1.5 mg. of a compound selected from the group consisting of the D-isomer of 3,5,3'-triiodothyronine and its nontoxic pharmaceutical salts.

References Cited in the file of this patent

UNITED STATES PATENTS

| 2,823,164 | Pitt-Rivers | Feb. 11, 1958 |
| 2,925,364 | Bechtol | Feb. 16, 1960 |

OTHER REFERENCES

Trother: The Lancet, June 9, 1956, pp. 885–889.

Endocrinology, vol. 60, January 1957, pp. 161–162.

Federation Procs., 17:1, Part I, March 1958, p. 373, No. 1471.

Starr: A.M.A., Archives of Internal Med., vol. 101, April 1958, pp. 722–730.

Boyd: British Medical Bull., 14:3, September 1958, pp 239–242.